US006630855B2

(12) United States Patent
Fayneh et al.

(10) Patent No.: US 6,630,855 B2
(45) Date of Patent: Oct. 7, 2003

(54) CLOCK DISTRIBUTION PHASE ALIGNMENT TECHNIQUE

(75) Inventors: Eyal Fayneh, Givatayim (IL); Ernest Knol, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/819,716

(22) Filed: Mar. 29, 2001

(65) Prior Publication Data

US 2002/0140487 A1 Oct. 3, 2002

(51) Int. Cl.[7] .................................................. H03K 5/12
(52) U.S. Cl. ........................ 327/295; 327/291; 327/293; 327/297; 327/292
(58) Field of Search ................................ 327/291, 292, 327/293, 294, 295, 156, 297

(56) References Cited

U.S. PATENT DOCUMENTS

| 5,420,544 A | * | 5/1995 | Ishibashi ..................... 327/292 |
| 5,465,347 A | * | 11/1995 | Chao et al. | |
| 5,880,612 A | * | 3/1999 | Kim ............................ 327/292 |
| 5,949,262 A | | 9/1999 | Dreps et al. ................. 327/156 |
| 6,075,832 A | * | 6/2000 | Geannopoulos et al. | |

* cited by examiner

*Primary Examiner*—Dinh T. Le
(74) *Attorney, Agent, or Firm*—Antonelli, Terry, Stout & Kraus, LLP

(57) ABSTRACT

A phase alignment technique includes providing a clock signal to a first clock distribution spine and providing at least one additional clock distribution spine. One PLL (Phase Locked Loop) is provided for each additional clock distribution spine, each PLL having an REF input and an FBK input and an output. The REF input of each PLL is connected to the first clock distribution spine and the FBK input of each PLL is connected to its respective clock distribution spine and the output of each PLL is connected to its respective clock distribution spine to provide a clock signal thereto. Each PLL provides phase alignment between the clock signal on the first clock distribution spine and the clock signal outputted by the PLL to its respective clock distribution spine. The first clock distribution spine and each additional clock distribution spine and its respective PLL may be disposed on an integrated circuit die.

25 Claims, 3 Drawing Sheets

CLOCK DISTRIBUTION PHASE ALIGNMENT TECHNIQUE

FIELD

The present invention relates to a clock distribution phase alignment technique and more particularly to an active phase alignment technique utilizing a PLL (Phase Locked Loop).

BACKGROUND

At present, many integrated circuits, particularly large-scale integrated circuits, require a clock signal to be distributed to numerous locations throughout the integrated circuit die. Processors, such as microprocessors, are but one example of such large-scale integrated circuits requiring a clock signal to be distributed throughout the integrated circuit die.

In the past, the clock speeds of the clock signals in such integrated circuits were slow enough to such that the difference in phase (skew) between the clock signal at one point in the integrated circuit die and the clock signal at another point in the integrated circuit die was negligible.

Accordingly, as illustrated in FIG. 1, an integrated circuit die 100 included a clock signal generator 114 connected to a buffer amplifier 115 which was in turn connected to a clock distribution spine 110. The left side of the die received the clock signal from the outputs of buffer amplifiers 120, 121, 122, and 123 while the right side of the die received the clock signal from the outputs of buffer amplifiers 124, 125, 126, and 127.

However, with the advent of integrated circuits having extremely high clock speeds (into the GHz range), it has been found that the single clock distribution arrangement as illustrated in FIG. 1 is unsuitable in view of the fact that the skew between the clock signal at one point in the integrated circuit die is no longer negligible with respect to the clock signal at another point in the integrated circuit die.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
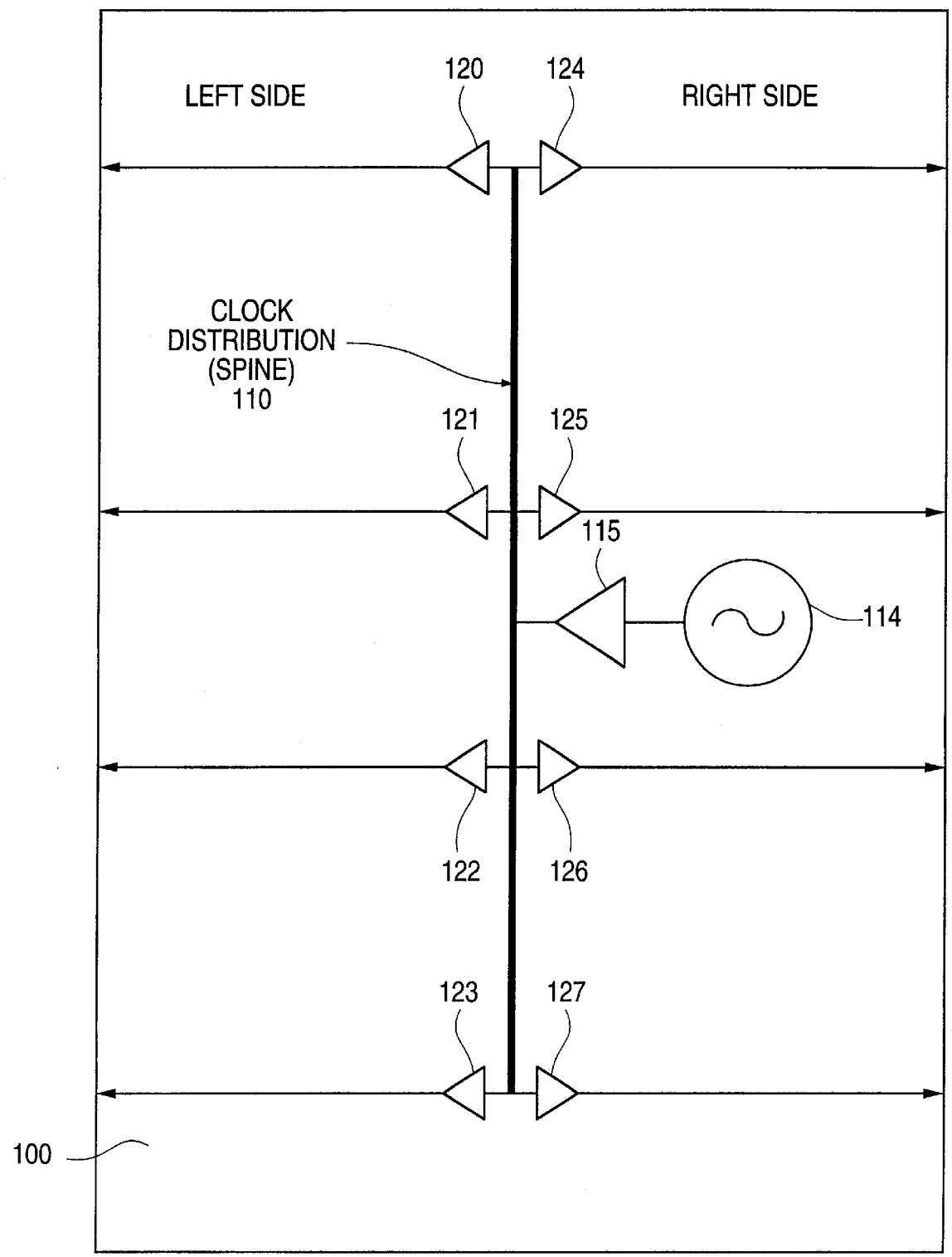
FIG. 1 illustrates a single clock distribution spine arrangement in an integrated circuit die.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. In addition, well-known power connections and other components have not been shown within the drawing figures for simplicity of illustration and discussion and so as not to obscure the present invention.

In view of the clock skew noted above, high-performance clock distribution networks are needed to generate a coherent clock signal across the integrated circuit die. The clock distribution network skew is determined by two main factors, namely, clock line delay and clock driver delay variations over the die due to process variations.

The clock signal distribution in a large integrated circuit die requires long clock lines that becomes the major contributor to the clock signal skew. One technique used to decrease the clock network distribution skew is to split the clock network into two networks. Each network distributes the clock signal to one-half of the die so that the clock line lengths are shortened, thereby reducing the clock skew.

In such a dual clock distribution arrangement as noted above, the delay from the common input from the clock signal generator to each network output varies due to die process variations within the integrated circuit die, these variations affecting the delay of the various clock buffer amplifiers. Accordingly, the clock signal on one of the two networks is skewed with respect to the clock signal on the other of the two networks unless a phase de-skewing mechanism is added to match the two network delays.

Figure 2:
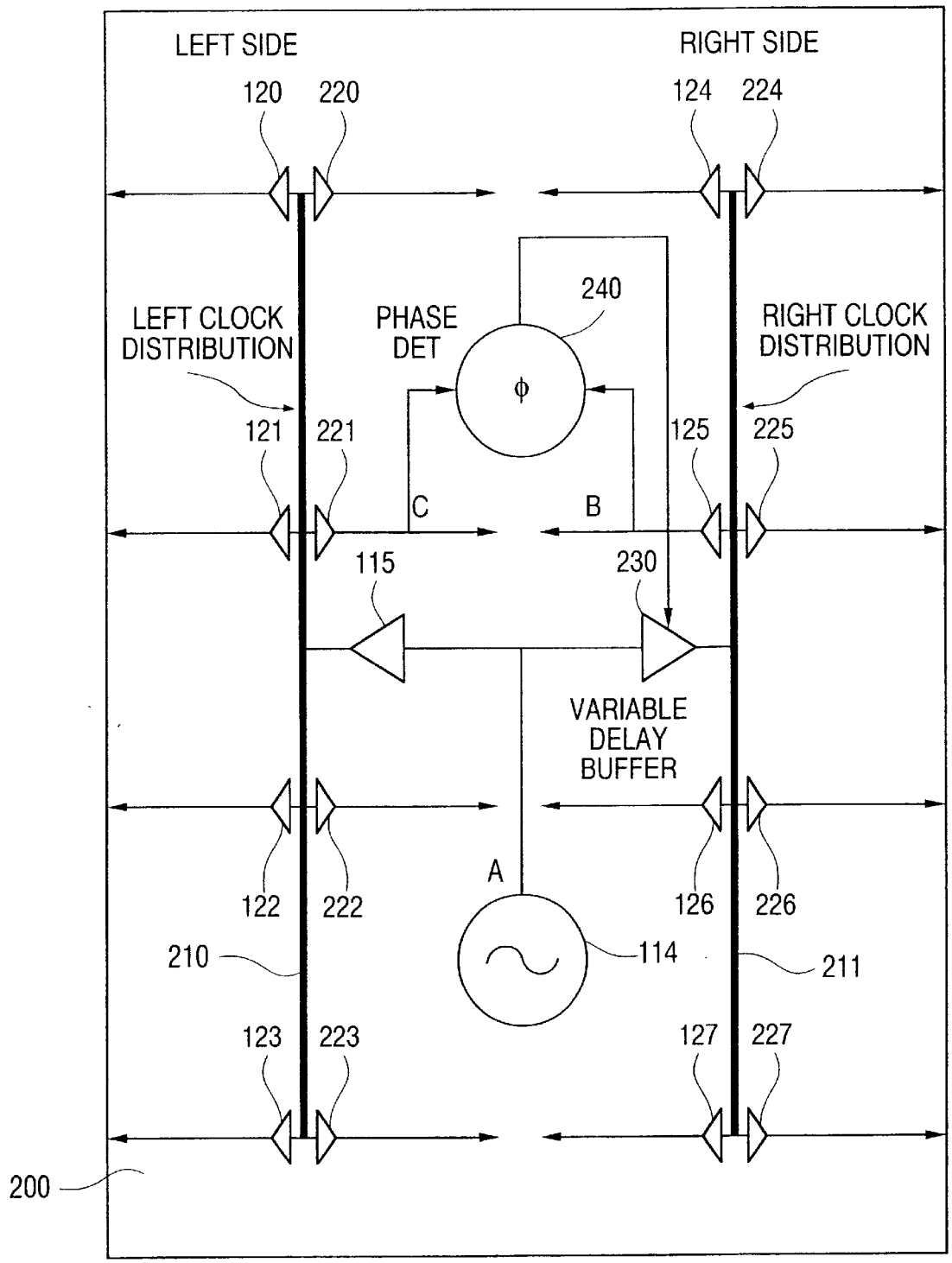
FIG. 2 illustrates an example disadvantageous two clock distribution spine arrangement in an integrated circuit die.

FIG. 2 illustrates an example of a disadvantageous two clock distribution spine arrangement in an integrated circuit die. As shown in FIG. 2, disposed within the integrated circuit die 200 are two clock distribution spines, namely, a left clock distribution spine 210 and a right clock distribution spine 211. Buffer amplifiers 120, 121, 122, 123, 220, 221, 222, and 223 receive and distribute the clock signal from the left clock distribution spine 210 to various points on the left side of the die. Similarly, buffer amplifiers 124, 125, 126, 127, 224, 225, 226, and 227 receive and distribute the clock signal from the right clock distribution spine 211 to various points on the right side of the die. The clock signal generated by the clock signal generator 114 is fed to the left clock distribution spine 210 by the buffer amplifier 115 and is fed to the right clock distribution spine 211 by the variable delay buffer amplifier 230 which will be discussed below.

A phase detector 240 is disposed within the die to detect the phase difference between the clock signal at point C and the clock signal at point B. The output of the phase detector is fed to the variable delay buffer 230. The variable delay buffer 230 is a passive phase de-skew device which is programmed by the phase detector 240 during reset of the integrated circuit and the amount of delay added by the variable delay buffer 230 is unchanged during operation of the integrated circuit until another reset occurs.

A disadvantage of the arrangement of FIG. 2 is that there is no correction for any phase variations between the left clock distribution spine 210 and the right clock distribution spine 211 due to voltage or temperature variations that occur after the delay in the variable delay buffer 230 has been set.

Figure 3:
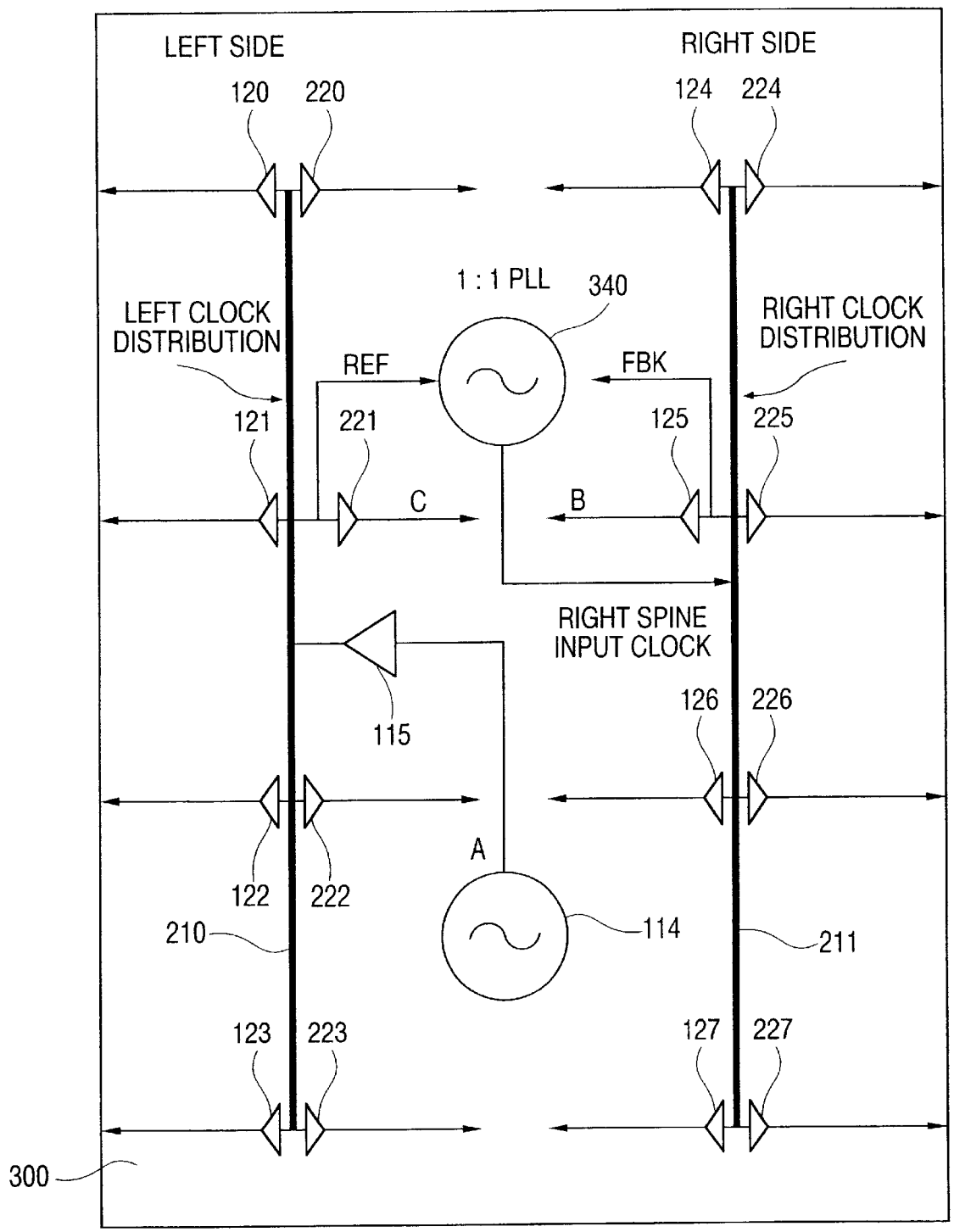
FIG. 3 illustrates an example of a two clock distribution spine arrangement in an integrated circuit die in accordance with an example embodiment of the present invention.

FIG. 3 illustrates an example of a two clock distribution spine arrangement in an integrated circuit die in accordance with an example embodiment of the present invention. As illustrated in FIG. 3, the arrangement differs from FIG. 2 in that the phase detector 240 and variable delay buffer 230 of FIG. 2 have been replaced by a 1:1 PLL (Phase Locked Loop) 340 disposed within the integrated circuit die 300. The PLL 340, which has a wide bandwidth, is used to de-skew the phase of the two distribution spines. A REF (Reference) input of the PLL 340 is connected directly to the left clock distribution spine 210 while the FBK (Feedback) input of the PLL 340 is connected to the right clock distribution spine 211. The output of the PLL 340 becomes the right spine input clock. The PLL 340 operates to minimize the skew between its reference signal phase input and its feedback signal phase input so that the clock signals on the two clock distribution spines are de-skewed. The PLL 340 is continuously active so that the phase de-skew operation continues all the time, thereby allowing the PLL 340 to track reference clock phase variations due to voltage and temperature variations over time. The PLL 340 acts as a filter by reducing Vcc noise frequencies inside the PLL bandwidth. The output of the PLL 340 is less sensitive to Vcc noise as compared to the phase detector 240 due to the low coupling of the PLL 340 to Vcc.

This concludes the description of the example embodiment. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

For example, although the example embodiment of FIG. 3 illustrates a two clock distribution spine arrangement, it is to be understood that the present invention is not limited to two clock distribution spines but rather can be applied to any number of clock distribution spines by merely providing a PLL for each clock distribution spine other than the one spine that is used as the reference for each PLL.

What is claimed is:

1. A phase alignment method on a same integrated circuit (IC) die, comprising:
   providing a first clock distribution spine to receive a clock signal from a clock signal generator;
   providing at least one additional clock distribution spine on the same IC die; and
   providing a PLL (Phase Locked Loop) for each of the at least one additional clock distribution spines, each PLL having an REF (Reference) input and an FBK (Feedback) input, and an output;
   wherein the REF input of each PLL is directly connected to the first clock distribution spine and the FBK input of each PLL is connected to its respective at least one additional clock distribution spine and the output of each PLL is connected to its respective at least one additional clock distribution spine to provide a clock signal thereto, each PLL providing phase alignment between the clock signal on the first clock distribution spine and the clock signal outputted to its respective at least one additional clock distribution spine.

2. The method of claim 1, further comprising providing the first clock distribution spine and each of the at least one additional clock distribution spines and its respective PLL on the same IC die.

3. The method of claim 1, wherein the at least one additional clock distribution spine comprises one additional clock distribution spine.

4. The method of claim 1, further comprising providing a plurality of buffer amplifiers respectively connected to the first clock distribution spine and the at least one additional clock distribution spine to distribute clock signals from their respective clock distributions spines.

5. The method of claim 2, further comprising providing a plurality of buffer amplifiers respectively connected to the first clock distribution spine and the at least one additional clock distribution spine to distribute clock signals from their respective clock distributions spines.

6. The method of claim 3, further comprising providing a plurality of buffer amplifiers respectively connected to the first clock distribution spine and the at least one additional clock distribution spine to distribute clock signals from their respective clock distributions spines.

7. The method of claim 1, wherein the FBK input of each PLL is directly connected to its respective at least one additional clock distribution spine.

8. A phase alignment apparatus comprising:
   a first clock distribution spine on an integrated circuit (IC) die to receive a clock signal from a clock signal generator;
   at least one additional clock distribution spine on the same IC die; and
   a PLL (Phase Locked Loop) for each of the at least one additional clock distribution spines, each PLL having an REF (Reference) input and an FBK (Feedback) input and an output;
   wherein the REF input of each PLL is directly connected to the first clock distribution spine and the FBK input of each PLL is connected to its respective at least one additional clock distribution spine and the output of each PLL is connected to its respective at least one additional clock distribution spine to provide a clock signal thereto, each PLL providing phase alignment between the clock signal on the first clock distribution spine and the clock signal outputted to its respective at least one additional clock distribution spine.

9. The apparatus of claim 8, wherein the first clock distribution spine and each additional at least one clock distribution spine and its respective PLL are disposed on the same IC die.

10. The apparatus of claim 8, wherein the at least one additional clock distribution spine comprises one additional clock distribution spine.

11. The apparatus of claim 8, further comprising providing a plurality of buffer amplifiers respectively connected to the first clock distribution spine and the at least one additional clock distribution spine to distribute clock signals from their respective clock distributions spines.

12. The apparatus of claim 9, further comprising providing a plurality of buffer amplifiers respectively connected to the first clock distribution spine and the at least one additional clock distribution spine to distribute clock signals from their respective clock distributions spines.

13. The method of claim 10, further comprising providing a plurality of buffer amplifiers respectively connected to the first clock distribution spine and the at least one additional clock distribution spine to distribute clock signals from their respective clock distributions spines.

14. The apparatus of claim 8, wherein the FBK input of each PLL is directly connected to its respective at least one additional clock distribution spine.

15. An integrated circuit (IC) die comprising:
   a first clock distribution spine on the IC die to receive a clock signal from a clock signal generator;
   at least one additional clock distribution spine on the same IC die; and a PLL (Phase Locked Loop) for each of the at least one additional clock distribution spines, each PLL having an REF (Reference) input and an FBK (Feedback) input and an output;

wherein the REF input of each PLL is directly connected to the first clock distribution spine and the FBK input of each PLL is connected to its respective at least one additional clock distribution spine and the output of each PLL is connected to its respective at least one additional clock distribution spine to provide a clock signal thereto, each PLL providing phase alignment between the clock signal on the first clock distribution spine and the clock signal outputted to its respective at least one additional clock distribution spine.

16. The die of claim 15, wherein the at least one additional clock distribution spine comprises one additional clock distribution spine.

17. The die of claim 15, further comprising providing a plurality of buffer amplifiers respectively connected to the first clock distribution spine and the at least one additional clock distribution spine to distribute clock signals from their respective clock distributions spines.

18. The die of claim 16, further comprising providing a plurality of buffer amplifiers respectively connected to the first clock distribution spine and the at least one additional clock distribution spine to distribute clock signals from their respective clock distributions spines.

19. The die of claim 15, wherein the FBK input of each PLL is directly connected to its respective at least one additional clock distribution spine.

20. An electronic system comprising:
a power supply;
a system memory; and
an integrated circuit (IC) die including:
a first clock distribution spine on the IC die to receive a clock signal from a clock signal generator;
at least one additional clock distribution spine on the same IC die; and
a PLL (Phase Locked Loop) for each of the at least one additional clock distribution spines, each PLL having an REF (Reference) input and an FBK (Feedback) input and an output;
wherein the REF input of each PLL is directly connected to the first clock distribution spine and the FBK input of each PLL is connected to its respective at least one additional clock distribution spine and the output of each PLL is connected to its respective at least one additional clock distribution spine to provide a clock signal thereto, each PLL providing phase alignment between the clock signal on the first clock distribution spine and the clock signal outputted to its respective at least one additional clock distribution spine.

21. The system of claim 20, wherein the FBK input of each PLL is directly connected to its respective at least one additional clock distribution spine.

22. A phase alignment method on a same integrated circuit (IC) die, comprising:
providing a first clock distribution spine to distribute a clock signal from a clock signal generator;
providing at least one additional clock distribution spine on the same IC die; and
providing a PLL (Phase Locked Loop) to provide a clock signal output to at least one of the at least one additional clock distribution spines, each PLL having an REF (Reference) input and an FBK (Feedback) input;
wherein the REF input of each PLL is directly connected to receive the clock signal from the first clock distribution spine and the FBK input of each PLL is connected to the at least one of the at least one additional clock distribution spines, each PLL providing phase alignment between the clock signal on the first clock distribution spine and the clock signal outputted to the at least one of the at least one additional clock distribution spines.

23. A phase alignment apparatus comprising:
a first clock distribution spine on an integrated circuit (IC) die to distribute a clock signal from a clock signal generator;
at least one additional clock distribution spine on the same IC die; and
a PLL (Phase Locked Loop) to provide a clock signal output to at least one of the at least one additional clock distribution spines, each PLL having an REF Reference) input and an FBK (Feedback) input;
wherein the REF input of each PLL is directly connected to receive the clock signal from the first clock distribution spine and the FBK input of each PLL is connected to the at least one of the at least one additional clock distribution spines, each PLL providing phase alignment between the clock signal on the first clock distribution spine and the clock signal outputted to the at least one of the at least one additional clock distribution spines.

24. An integrated circuit (IC) die comprising:
a first clock distribution spine on the IC die to distribute a clock signal from a clock signal generator;
at least one additional clock distribution spine on the same IC die; and
a PLL (Phase Locked Loop) to provide a clock signal output to at least one of the at least one additional clock distribution spines, each PLL having an REF (Reference) input and an FBK (Feedback) input;
wherein the REF input of each PLL is directly connected to receive the clock signal from the first clock distribution spine and the FBK input of each PLL is connected to the at least one of the at least one additional clock distribution spines, each PLL providing phase alignment between the clock signal on the first clock distribution spine and the clock signal outputted to the at least one of the at least one additional clock distribution spines.

25. An electronic system comprising:
a power supply;
a system memory; and
an integrated circuit (IC) die including:
a first clock distribution spine on the IC die to distribute a clock signal from a clock signal generator;
at least one additional clock distribution spine on the same IC die; and
a PLL (Phase Locked Loop) to provide a clock signal output to at least one of the at least one additional clock distribution spines, each PLL having an REF (Reference) input and an FBK (Feedback) input;
wherein the REF input of each PLL is directly connected to receive the clock signal from the first clock distribution spine and the FBK input of each PLL is connected to the at least one of the at least one additional clock distribution spines, each PLL providing phase alignment between the clock signal on the first clock distribution spine and the clock signal outputted to the at least one of the at least one additional clock distribution spines.

* * * * *

UNITED STATES PATENT AND TRADEMARK OFFICE
CERTIFICATE OF CORRECTION

PATENT NO. : 6,630,855 B2
DATED : October 7, 2003
INVENTOR(S) : Fayneh et al.

It is certified that error appears in the above-identified patent and that said Letters Patent is hereby corrected as shown below:

<u>Title page,</u>
Item [75], Inventors, delete "Knol, Ernest" and insert -- Knoll, Ernest --, therefor.

Signed and Sealed this

Twentieth Day of January, 2004

JON W. DUDAS
*Acting Director of the United States Patent and Trademark Office*